United States Patent
Nowoisky et al.

(10) Patent No.: US 11,970,949 B2
(45) Date of Patent: Apr. 30, 2024

(54) METHOD AND SYSTEM FOR DETECTING A FUNCTIONAL FAILURE IN A POWER GEARBOX AND A GAS TURBO ENGINE

(71) Applicant: ROLLS-ROYCE DEUTSCHLAND LTD & CO KG, Blankenfelde-Mahlow (DE)

(72) Inventors: Sebastian Nowoisky, Michendorf (DE); Lucia Ciciriello, Berlin (DE); Mateusz Grzeszkowski, Berlin (DE); Noushin Mokhtari Molk Abadi, Berlin (DE)

(73) Assignee: ROLLS-ROYCE DEUTSCHLAND LTD & CO. KG, Blankenfelde-Mahlow (DE)

( * ) Notice: Subject to any disclaimer, the term of this patent is extended or adjusted under 35 U.S.C. 154(b) by 50 days.

(21) Appl. No.: 17/638,168

(22) PCT Filed: Aug. 31, 2020

(86) PCT No.: PCT/EP2020/074216
§ 371 (c)(1),
(2) Date: Feb. 24, 2022

(87) PCT Pub. No.: WO2021/038101
PCT Pub. Date: Mar. 4, 2021

(65) Prior Publication Data
US 2022/0349318 A1    Nov. 3, 2022

(30) Foreign Application Priority Data
Aug. 30, 2019    (EP) ...................... 19194753

(51) Int. Cl.
*F01D 21/14*    (2006.01)
*F02C 7/36*    (2006.01)

(52) U.S. Cl.
CPC ............... *F01D 21/14* (2013.01); *F02C 7/36* (2013.01); *F05D 2220/323* (2013.01);
(Continued)

(58) Field of Classification Search
CPC ...... F01D 21/14; F02C 7/36; F05D 2220/323; F05D 2260/40311; F05D 2260/80;
(Continued)

(56) References Cited

U.S. PATENT DOCUMENTS

| 2017/0145852 A1 | 5/2017 | McCune et al. |
| 2017/0260871 A1 | 9/2017 | Schmidt et al. |

(Continued)

OTHER PUBLICATIONS

European Search Report dated Feb. 28, 2020 from counterpart European Patent Application No. 19194753.0.
(Continued)

*Primary Examiner* — Edwin A Young
(74) *Attorney, Agent, or Firm* — SHUTTLEWORTH & INGERSOLL, PLC; Timothy J. Klima

(57) ABSTRACT

A method and system for detecting a functional failure in a power gearbox, includes a) measuring operational data in a gas turbine engine of operational parameters dependent on power generation and power consumption of the engine or the gearbox, b) obtaining analyzed operational data including time data, angular data of rotation, frequency data and/or phase data, c) using the analyzed operational data in a comparison with stored baseline operational data to determine deviation data, d) determining time dependent trend data from the deviation data or determining a first state measured dependent on the power generation, power consumption or power regulation of the engine and measuring a second state dependent on vibrational data of the engine, e) generating a signal and/or a protocol for controlling the gearbox, and/or the engine based on the time dependent (Continued)

trend data, if a threshold is exceeded or based on the first or second states.

16 Claims, 9 Drawing Sheets

(52) U.S. Cl.
CPC .............. *F05D 2260/40311* (2013.01); *F05D 2260/80* (2013.01); *F05D 2270/304* (2013.01); *F05D 2270/309* (2013.01); *F05D 2270/334* (2013.01); *F05D 2270/335* (2013.01)

(58) Field of Classification Search
CPC ........ F05D 2270/309; F05D 2270/334; B60W 10/06; B60W 10/115
See application file for complete search history.

(56) References Cited

U.S. PATENT DOCUMENTS

2018/0328289 A1   11/2018  Madge
2020/0153527 A1*  5/2020  Matsunaga ........... H04J 3/0664

OTHER PUBLICATIONS

International Search Report and Written Opinion dated Dec. 4, 2020 from counterpart International Patent Application No. PCT/EP2020/074216.

* cited by examiner

METHOD AND SYSTEM FOR DETECTING A FUNCTIONAL FAILURE IN A POWER GEARBOX AND A GAS TURBO ENGINE

This application is the National Phase of International Application PCT/EP2020/074216 filed Aug. 31, 2020 which designated the U.S.

This application claims priority to European Patent Application No. 19194753.0 filed Aug. 30, 2019, which application is incorporated by reference herein.

The present disclosure relates to a method for detecting a functional failure of a power gearbox, a system for detecting a functional failure in a power gearbox and a gas turbine engine with features as disclosed herein.

Power gearboxes are e.g. in the context of aircraft engines gearboxes which transmit a large torque required for propulsion. This differentiates power gearboxes from e.g. accessory gearboxes. In many cases, epicyclic gearboxes are used as power gearboxes. Power gearboxes, in particular epicyclic gearboxes are often subject to high mechanical loads or have to operate for a long time without maintenance. One typical application of power gearboxes are epicyclic gearboxes is a geared turbofan aircraft engine in which the epicyclic gearbox lowers the rotational speed of the fan shaft which is driven by the turbine section of the geared turbofan engine.

Therefore, is important to find ways to monitor power gearboxes for mechanical failures.

This issue is addressed by a method for detecting a functional failure with features as disclosed herein.

First operational data in the gas turbine engine is measured using at least one, in particular at least two operational parameters dependent on the power generation and power consumption of the gas turbine engine and/or the epicyclic gearbox. The operational parameter depend e.g. on way the engine power is controlled by the combined effect of at least two parameters. The operational parameters can depend on the power or performance regulation of the gas turbine engine.

The power transmitted across the power gearbox is given by torque×speed determined at input and output shaft.

For example control of engine power for a geared turbofan engine comprising a fan shaft and a two-spool core engine is achieved by regulating fuel flow (throttle) and stator variable positions to regulate the air flow intake—primarily at an intermediate compressor—and variable inlet guide vanes and/or variable stator vane angles, as they change the compressor flow capacity. On geared turbofan control action can take part on two vanes at the same time.

As will be explained below, changes in parameters related to the power characteristics transmitted across the gearbox are indicators for some of the planetary gear train component failures, in particular planet bearings.

Then analyzed operational data is obtained, the analyzed operational data comprising time data, angular data of a rotation, frequency data and/or magnitude data and phase data from the measured operational data. This means that data can e.g. be filtered and transformed into different domains in a signal processing unit.

The analyzed operational data then compared with stored baseline operational data to determine deviation data from the baseline nominal operational data. The baseline operational data represents nominal behavior of the system (e.g. without a planet bearing failure), so that the comparison yields deviations from that nominal behavior. Any trend described hereby in the general method is related and comparable under equivalent operative conditions, such engine power, torque, speed, altitude, external pressure and temperature, propeller pitch, cross wind etc.

Time dependent trend data from the deviation data is determined and/or at least a first state measured dependent on the power generation, the power consumption or the power regulation of the gas turbine engine and at least a second state measured dependent on vibrational data of the gas turbine engine is determined, Trend data has to be understood in a broad sense, as e.g. all occurring changes in the time dependent data and/or a drift in the engine performance can be considered as a trend. The changes can be detected between different parameters (e.g. a set of parameters) in an engine controller, e.g. to obtain a given engine power at the certain flight conditions, of changes in the fuel flow and/or changes in the compressor variable vanes or flow inlets, due to failure in the mechanical torque load path (e.g. planets bearing).

The engine power control can have two or more active parameters that are necessary to be control the engine performance. Besides active parameters, temperature, pressure, and altitude are parameters that are considered in the engine power regulation setting. Embodiments described herein have the capability of recognising variations in the engine power settings that, if related with specific trend and phase changes of the characteristic vibration frequencies, allow an early detection of the mechanical failure, e.g. a bearing failure.

When a change happens in the torque load path of the gear train, the control system will automatically compensates it injecting or reducing energy and therefore changing torque shared by the planet gears and bearings.

Then a signal and/or a protocol is generated for controlling the epicyclic gearbox and/or the gas turbine engine based on the time dependent trend data, in particular if a predetermined condition or threshold is exceeded. In addition or alternatively a signal and/or a protocol is generated for controlling the epicyclic gearbox and/or the gas turbine engine dependent on the at least one first state and the at least one second state. In this embodiment the measured vibrational data is used in control of the gearbox and/or the gas turbine engine.

This allows that the failure has an operational consequence to prevent e.g. more damage to the engine and actuate a safety protocol.

In one embodiment, at least one measured operational parameter and/or at least one baseline operational parameter is a torque at a shaft of the gas turbine engine,
a torque at power gearbox, in particular the epicyclic gearbox,
a tangential torque of the power gearbox, in particular the epicyclic gearbox,
a rotational speed of the shaft,
a rotational speed at the input and/or output side of the power gearbox, in particular of the epicyclic gearbox,
a power loss over the input and output side of the power gearbox, in particular the epicyclic gearbox,
speed of the aircraft,
vibrational data at the power gearbox, in particular the epicyclic gearbox (e.g. obtained from acceleration sensors, acoustic sensors and/or strain sensors),
fuel intake of the gas turbine engine,
a temperature, in particular in the core of the gas turbine engine and/or at the exit of a combustion chamber,
a temperature in the feed and/or scavenge oil temperature of the power gearbox, in particular the epicyclic gearbox, at least one position and/or at least one a movement of a variable guide vane in the gas turbine engine, a pressure in the gas turbine engine, a deviation from the nominal in at least one of the above parameters.

Rotational speed, temperature, fuel intake, positioning of vanes, positioning of valves, pressures, torque, power, true air speed and altitude are example for operational parameters dependent on the engine power or performance regulation.

These parameters are all related to the power consumption. If a failure occurs in the epicyclic gearbox, one of those parameters and hence the power consumption will be affected. For example an increase in the oil temperature of the scavenged oil in a gearbox could be an indication of a mechanical failure which increased friction within the gearbox.

Regarding the vibrations, frequencies of e.g. up to 1000 Hz would provide essential discriminating information to detect a planet bearing failure in 90% of the cases, Gear mesh frequencies mesh and its multiples, GFM (15 KHz and more) is an indicator of a gearbox transmission failure that can sometime generate an ancillary trend in parallel to the main planet bearing failure indicators at much lower frequencies In a further embodiment, the time data obtained from the measured operational data is subjected to windowing in a signal processing unit.

The deviation data can e.g. comprise a change in magnitude of an amplitude and/or a change in the phase of a signal in the frequency domain. Time dependent deviation data can e.g. comprises data on at least one rotational speed of a shaft, at least one radial, axial and/or tangential dynamic load indicators, at least one radial, axial and/or tangential vibration.

Load measures are not always available in flight situations. The method and system discussed here has have capability to identify from vibration and performance as a combined analysis a combination parameters that represent dynamic loads indicators of an future failure in planet bearings e.g. a gearbox output and input unbalance rotating vector (magnitude and phase) or journal oil film rotating vectors. Torque oscillations can be obtained by fuel oscillation data and tangential vibration.

In a further embodiment, the trend data is checked if a condition or threshold is exceeded for at least a trend in a radial, axial and/or tangential vibration, a trend in a radial, axial and/or tangential dynamic load indicators, a trend in speed, in particular speed fluctuations.

In one embodiment the threshold is adapted for range of operation points by the use of á priori knowledge, in particular that known magnitudes of harmonics which are not related to a failure are considered in filtering out relevant harmonics for the failure. Not all magnitudes are relevant for detecting the failure, so the filtering makes sure that relevant data is generated and processed.

Another embodiment comprises a signal and/or the protocol used for indicating a functional failure of a bearing, in particular a ball bearing or a journal bearing in the epicyclic gearbox, the ring gear, planet carrier, the sun gear and/or the planet gears. These components are in the power train of the gas turbine engine, so that a failure affects the power output. Further, is possible that the signal and/or the protocol is used for generating a lifetime prediction and/or a maintenance schedule for the epicyclic gearbox and/or the gas turbine engine.

The signal and/or protocol can e.g. be triggered when the measured operational data comprises at least one significant deviation from the baseline, e.g. involving one or more vibrational frequencies characteristic of the planet bearing failure, in particular shaft×number of failing bearing and harmonics.

The measured operational data is obtained in one embodiment from at least one power sensor, fuel flow sensor, torque sensor, rotational speed sensor, speed sensor, vibration sensor, temperature sensor and/or pressure sensor. Again, those quantities are related to the power consumption of the gas turbine engine and the epicyclic gearbox. The vibration sensor can e.g. be an acceleration sensor, an acoustic sensor and/or a strain gauge.

At least one sensor can be positioned at a static part of the epicyclic gearbox, in particular at housing of the epicyclic gearbox, a ring gear of the epicyclic gearbox and/or the ring gear mount of the epicyclic gearbox.

It should be noted that the epicyclic gearbox could comprise planetary gears in a star arrangement or in a planetary arrangement. This means that the ring gear, the carrier or the sun gear can static, i.e. fixed.

A further embodiment of the method use a detection of a vibration signature within a predetermined frequency range, a determination of a property of the vibration signature based on the signals at different points in time and a generation of a command or signal based on a comparison of the property of the vibration signature with a predetermined threshold.

The issue is also addressed by a system and a gas turbine engine with features as disclosed herein.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described byway of example only, with reference to the Figures, in which.

Figure 1:
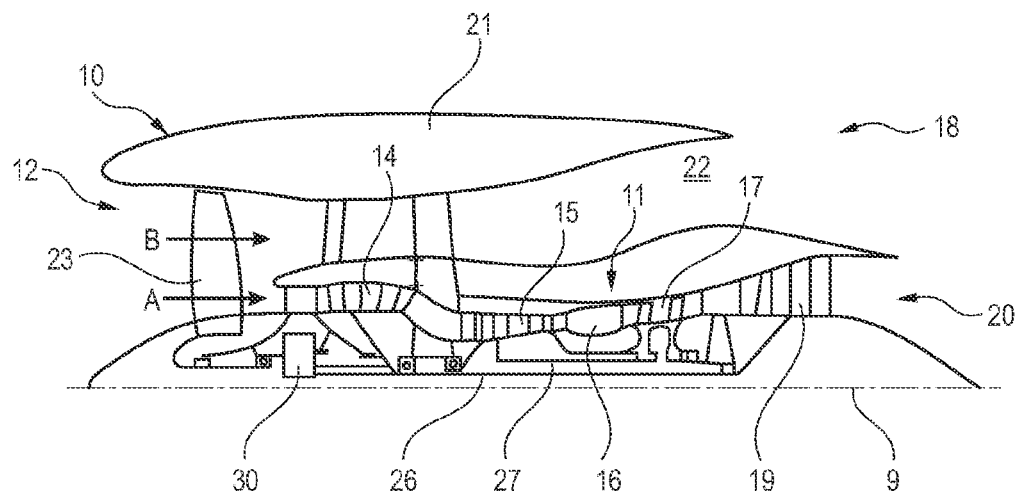
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
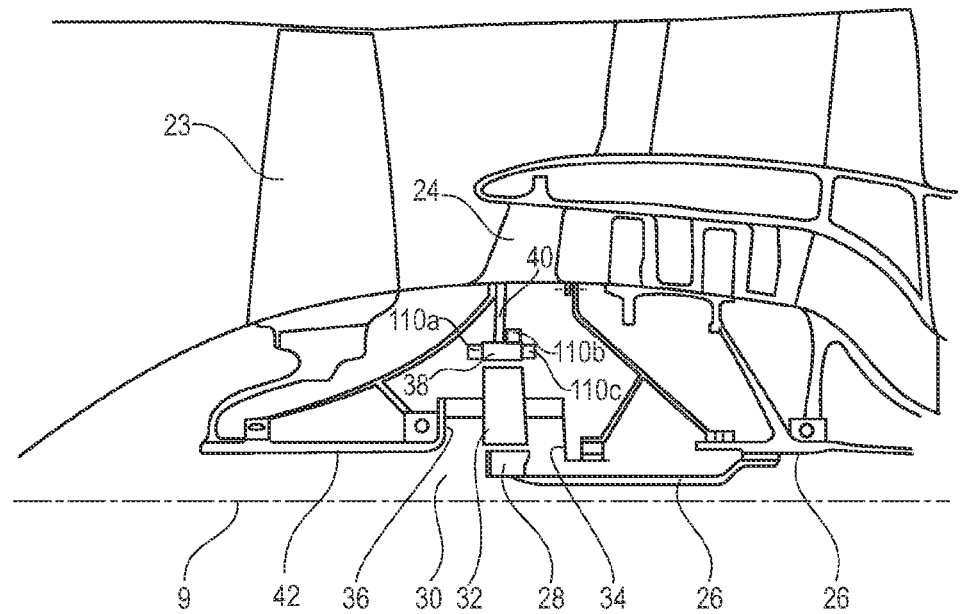
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
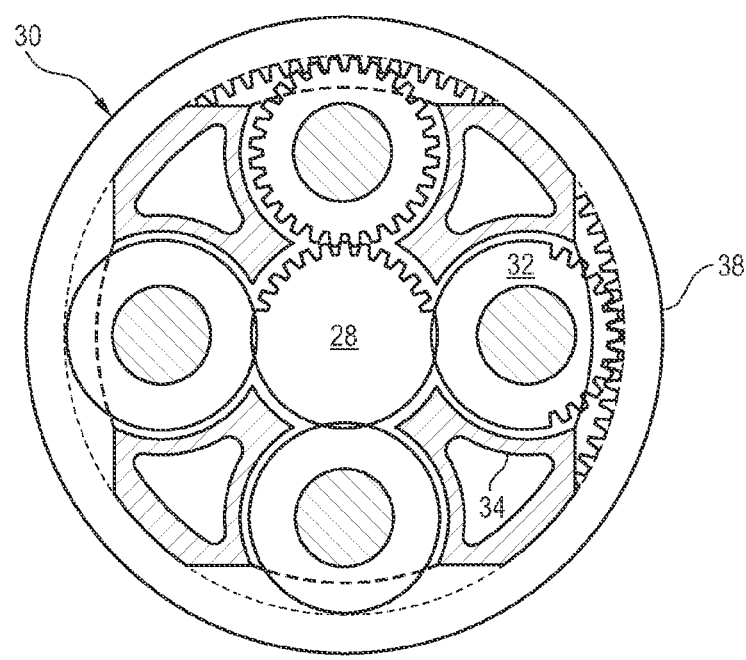
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

From the above it is clear that the gearbox 30 is subjected to considerable mechanical loads while having long maintenance intervals. In the following embodiments of a method and a system for detecting mechanical failures are described in connection with an epicyclic gearbox 30 in a planetary arrangement, i.e. with a fixed ring gear mount 41 and a rotatable planet carrier 34. The embodiments are also applicable for epicyclic gearboxes in a star arrangement, i.e. with a fixed planet carrier and a rotatable ring gear mount.

Even if the embodiments are described with an epicyclic gearbox 30 in the context of an aircraft gas turbine engine 10, the embodiments described herein are generally applicable to epicyclic gearboxes 30.

In FIG. 2, the side-sectional view of an epicyclic gearbox 30 in a planetary arrangement, also shows possible locations for sensors 110a, 110b, 110b. The sun gear 28 is driven by the shaft 26. As described above, the ring gears 38 are mounted statically on the ring gear mount 41. The planet gears 32 are moving rotatably between the sun gear 28 and the ring gear 38 transmitting the input torque from the shaft 26 to the planet carrier 34 which in turn drives the output shaft 42 (fan shaft, carrier shaft) of the epicyclic gearbox 30.

In the following, embodiments of methods and systems for the detection of functional failures in an epicyclic gearbox are described in more detail. Input data for those embodiments is in part gathered by sensors 110. FIG. 2 shows three sensors 110a, 110b, 110c that are placed on static parts of the epicyclic gearbox 30, here the ring gear mount 41 and the ring gear 38.

In alternative embodiments, less than three or more than three sensors 110 can be used. The static part on which the sensors 110 are located can be elsewhere, e.g. further away from the epicyclic gearbox 30, depending on the operational parameter measured by the sensor 110. The sensors 110 do not have to be placed in proximity together, as suggested by FIG. 2. Depending on the operational parameter measured, the sensors 110 can be placed apart from each other.

In the embodiment shown in FIG. 2, the three sensors 110a, 110b, 110c are all vibrational sensors using e.g. an accelerometer to detect vibrations (in radial, axial and/or tangential direction) relatively close to the epicyclic gearbox 30. Alternatively, at least one of the sensors 110 could be an acoustic sensor detecting solid body sound from the epicyclic gearbox 30, a strain gauge or a pressure sensor detecting the air pressure in the space surrounding the epicyclic gearbox 30. Other possibilities are described below.

Figure 4:
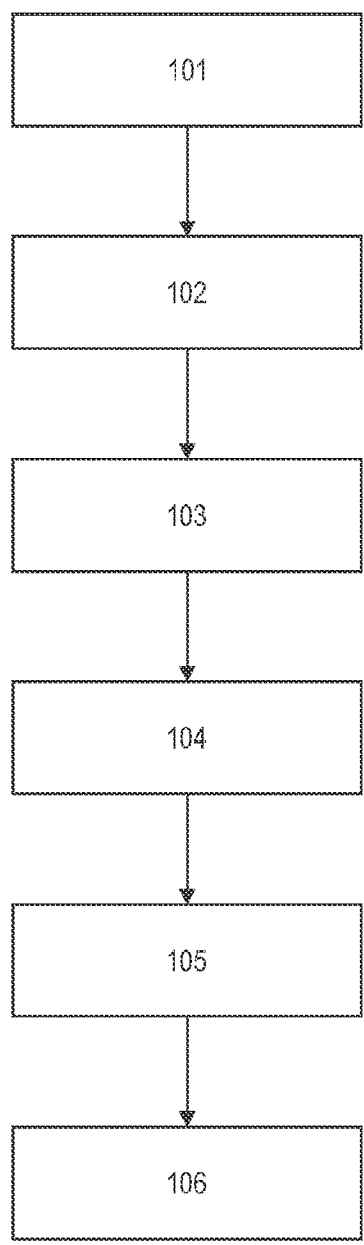
FIG. 4 shows a flowchart of an embodiment of a method for detecting a functional failure in an epicyclic gearbox.

In FIG. 4, a schematic overview of a method for detecting functional (operational, mechanical) failures in an epicyclic gearbox 30 is given.

In epicyclic gearboxes 30 an incipient failure or malfunctioning e.g. in the pinion bearings of the planetary gears 32 can be detected from the early stages by monitoring deviations from nominal conditions in the engine power over time in comparison to a nominal baseline obtained throughout the flight envelope conditions.

The power transmitted across the planetary gear train can be expressed by power=output torque×carrier speed or power=input torque×sun shaft speed being the two different equations for the amount of epicyclic gearbox power loss and fixed-gear assembly elastic deformation. The assembly elastic deformation being inversely proportional to the torsional stiffness of the static ring gear mount 41 and the engine frame.

In flight, the malfunctioning of e.g. one or more of the bearings of the planet gears 32 generates bearing loads outside the nominal design envelope, in particular the torque tangential distribution on the epicyclic gearbox 30 shafts (i.e. input and output shafts 26, 42) is altered, and a consequent change (deviation) in the power transmitted across the epicyclic gearbox 30 takes place.

The above-mentioned change in the torque tangential distribution is mathematically related to the modification of the load sharing factor.

The tangential torque deviation, or redistribution (i.e. among the planet gears), due to one or more planet bearing malfunctioning generates dynamic loads that are detected with engine sensors 110 such as torque meters (AC), vibration sensors and/or speed encoders as a spectral component at the frequency:

Carrier shaft×number of malfunctioning planet bearings
Sun shaft×1/τ number of malfunctioning planet bearings
(τ: transmission ratio, input shaft speed/output shaft speed)

together with a combination their harmonics and subharmonics. The frequencies and harmonics can be obtained from measured operational data 101 using e.g. a Fast Fourier Transformation. This allows an analysis of amplitudes and/phase properties of the frequency data.

The focus is here on the tangential direction, as loads in tangential direction are those directly controlled by the engine power controller (i.e. the speed controller acts in tangential direction). However, radial and/or axial loads can be subjected to major deviation too, depending on the gearbox 30 stiffness, inertia ratios and typology of teeth and bearings.

The magnitude of the tangential, radial and axial dynamic load generated by a pinion bearing malfunctioning depends on the epicyclic gearbox 30 stiffness to inertia ratio, the pinion bearing design, gear typology and the entity of the incipit failure. The dynamic load magnitudes are also known to be variable versus the engine power across the flight envelope due to change in stiffness and whole engine critical speeds. Therefore, changes in magnitude allow an assessment of the physical relationships mentioned.

The phase of the dynamic loads generated by a torque deviation remains almost constant versus engine speed, when measured on a period equal to a epicyclic gearbox 30 shaft revolution, being the torque tangential redistribution due to a bearing failure almost independent from the response to unbalance, which phase is instead strongly variable with engine speed (inversion at resonances). Phase analysis is used here in order to distinguish the power deviation indicators from rotor dynamic loads (unbalance, misalignments etc.)

Considering this, embodiments are able to distinguish if a rotating load is coming from a bearing failure or anomaly or form some dynamic response of the rotors. The latter are considered and accounted in the vibration limits and are not considered here. For instance in a fixed ring gear planetary gearbox, a single planet bearing failure would generate a load tracked at the frequency of the 1/Rev carrier (i.e. 1 per revolution of the planet carrier 34); the 1/Rev carrier is also the frequency at which the carrier unbalance would excite the system resonances. Therefore the present system recognizes if a rotor response is due to a bearing failure or to a critical speed. This can be achieved by the mean of phase analysis, but is not limited to this method.

In the following, an embodiment using these relationships for the detection of operational failures in an epicyclic gearbox 30 will be described.

In a first step, operational data 101 is measured in the gas turbine engine 10. The measured operational data 101 comprises at least two operational parameters dependent on the power generation and/or power consumption of the gas turbine engine 10 and/or the epicyclic gearbox 30. The operational parameters measured can e.g. be:
- a torque at a shaft 26, 27, 42 of the gas turbine engine 10,
- a torque at the power gearbox, in particular the epicyclic gearbox 30,
- a tangential torque of the power gearbox, in particular the epicyclic gearbox 30,
- a rotational speed of the shaft 26, 27, 42,
- a rotational speed at the input and/or output side of the of the power gearbox, in particular the epicyclic gearbox 30,
- a power loss over the input and output side of the power gearbox, in particular the epicyclic gearbox 30,
- speed of the aircraft,
- vibrational data at the power gearbox, in particular the epicyclic gearbox 30,
- fuel intake of the gas turbine engine 10,
- a temperature, in particular in the core of the gas turbine engine 10 and/or at the exit of a combustion chamber 16,
- a temperature in the feed and/or scavenge oil temperature of the power gearbox, in particular the epicyclic gearbox 30,
- at least one position and/or at least one movement of a variable guide vane in the gas turbine engine 10,
- a pressure in the gas turbine engine 10,
- a deviation from the nominal in at least one of the above parameters.

Data (and temporal variations in that data) related to at least one of those parameters gives an indication about the functional state of the gas turbine engine 10 and/or the epicyclic gearbox 30.

They parameters mentioned are indicators of the engine power level and consequently they correspond to the parameters in the active control loops of the engine controller (FADEC). If e.g. planet bearing is failing, being it located in the torque (power) load path, the control system will see a change the system characteristics and therefore will be in need to compensate with a different setting regulation (e.g. fuel flow and variable stator geometry). Embodiments recognizes this variation from the engine standard conditions (baseline) at that speed, power, altitude, temperature etc. that otherwise could even accelerate the bearing failure. In parallel to the variation in the control system parameters, the presented method looks for dynamic load indicators (e.g. rotating load at 1/Rev carrier)

In a next step, a signal processing unit 220 (see FIG. 6) in a computational device process the measured operational data 101 to obtain analyzed operational data 102 comprising time data, angular data of a rotation, frequency data and/or phase data from the measured operational data 101. Details about the analyzing are given in context with FIG. 6.

In a subsequent step, the analyzed operational data 102 is compared with stored baseline operational data 103 representing nominal operation conditions of the gas turbine engine 10 and/or the epicyclic gearbox 30. The baseline operational data 104 comprises analyzed data in similar way to enable the determination of deviation data 104 from the baseline operational data 103. This comparison allows a detection of deviations from the nominal operating conditions, i.e. in absolute terms.

Next, time dependent trend data 105 is determined from the deviation data 104. This means that not only absolute deviations are detected but changes in the deviations over time, i.e. time dependent trends. One example of trend is the occurrence of a peak under a failure of a part in frequency domain data.

When comparing the baseline 103 to the actual vibration analysis algorithms 102, some variables can be monitored. This results in some logical if-then comparisons.

Based on that time dependent trend data 105, a signal and/or a protocol 106 for controlling the epicyclic gearbox 30 and/or the gas turbine engine 10 is generated. Such signal and/or protocol 106 could e.g. be a command to shut down the gas turbine engine 10, to separate the output shaft 42 from the propulsive fan 23 or to reduce the rotational speed of the sun shaft 26.

Figure 5:
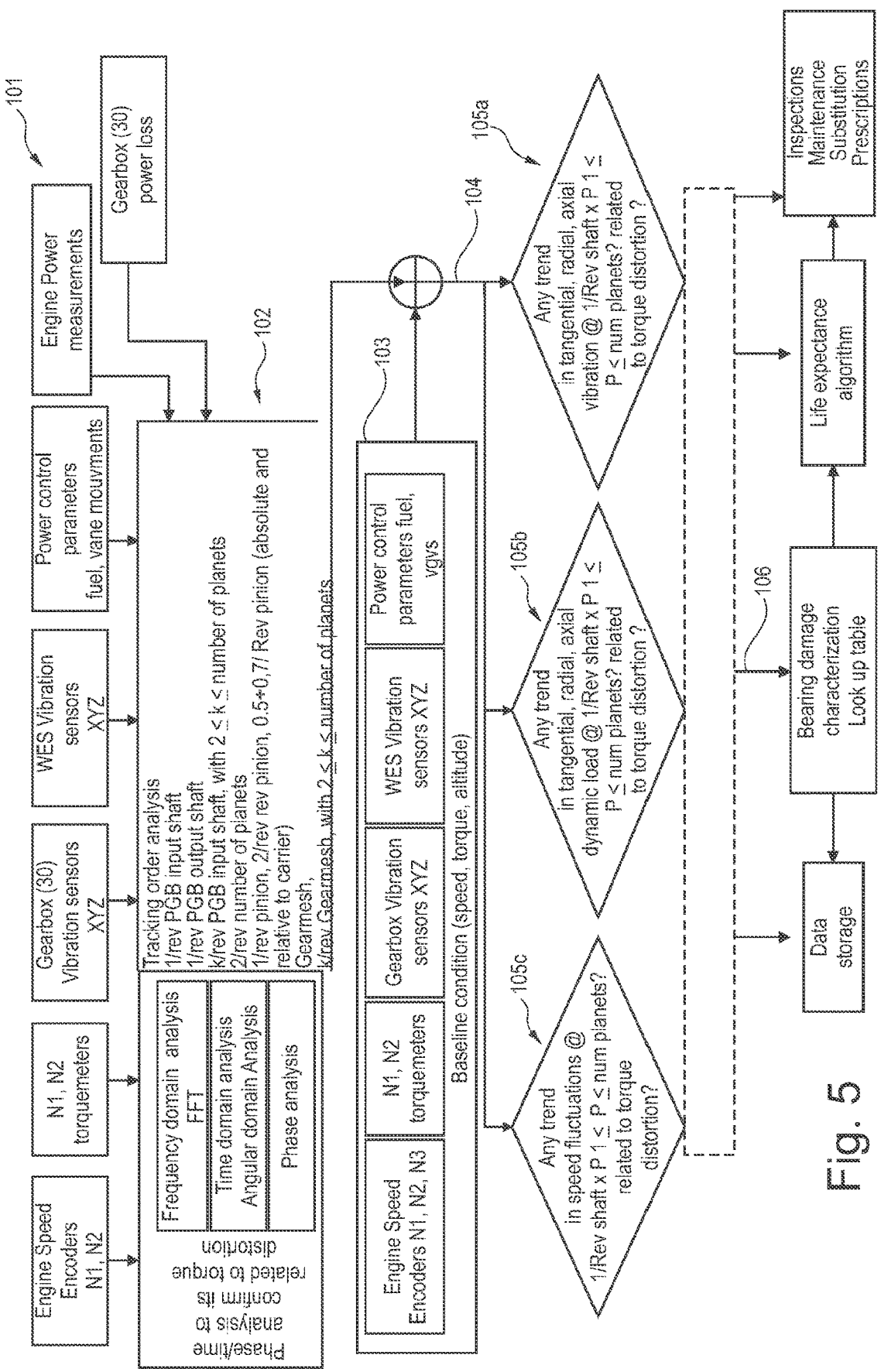
FIG. 5 shows a flowchart for a further embodiment of the method for detecting a functional failure in an epicyclic gearbox.

In connection with FIG. 5 an embodiment is described in more detail.

Starting point is the measured operational data 101. FIG. 5 gives a number of possibilities, which necessarily do not have to be used in total.

The rotational speeds N1 (speed of output shaft 42 of epicyclic gearbox 30), N2 (speed of input shaft 26 of epicyclic gearbox) with N1<N2 can be e.g. measured by an engine speed encoder and/or a torquemeter. N3 is the speed of the high pressure/high velocity rotor shafts. N3 it is directly regulated by the fuel intake and is mainly determining the maximal temperature in the engine. It is a good indicator of power.

A change in the speed, in and in particular a trend in the change can give an indication that there is an operational failure in an epicyclic gearbox 30, in particular in an aircraft gas turbine engine 10.

Another set of information can be obtained through vibration sensors 110, which detect vibrations in up to three-directions X,Y,Z in the epicyclic gearbox 30 and or the WES (Whole Engine Systems).

A further set of information is related to the power received and/or transmitted by the epicyclic gearbox 30. As discussed above, changes in power data can be indicative of failure of a part in an epicyclic gearbox 30. Fuel consumption data and/or data related to vane positions or movements in the gas turbine engine 10 allow a direct assessment of the power data. It is also possible to use calculated power data directly or to calculate the power loss over the epicyclic gearbox 30, i.e. the difference between power input and power output.

All this data is input for a signal processing unit 220, in which measured operational data 101 is transformed into analyzed operational data 102. In the embodiment shown, a Fast-Fourier Transformation (FFT) is used to find individual frequencies in the measured operational data 101. The time-dependent data can be analyzed using time domain analysis. From the FFT phase information is derived which then can be analyzed further.

In signal analysis, order tracking is to detect and follow (track) the causes of vibration over time or speed. In this, frequencies are harmonics or subharmonics of the shaft rotational frequency: e.g. 1/Rev of the shaft, 2/Rev of the shaft, 0.45 of the shaft etc.

Many of the engine orders are indicators of rotors unbalance (1×shaft), rotor misalignment (2×shaft), electrical motor drive problems (n×number of poles), blade passing frequency (number of rotor blades×shaft), planet passing frequency, planet bearing failure indicators etc. Engine order can be defined as e.g. sun shaft frequency divided by carrier shaft frequency.

All or a subset of the operational parameter information is used to detect changes (deviations from nominal) in the torque of the epicyclic gearbox 30 by comparing the analyzed operational data 102 with baseline operational data 103 which has been gathered before. The baseline operational data 103 is indicative of nominal operation conditions, in particular an operation without functional failures in the epicyclic gearbox 30. The baseline operational data 103 essentially comprises the same parameter set as the measured operational data 101, e.g. data obtained by engine speed encoders, torquemeters, vibration sensors and/or power control parameters. The baseline operational data 103 is stored also as time domain data, angular domain data and/or frequency domain data, so it can be compared with respective analyzed operational data 102.

By comparing the two datasets, deviation data 104 is determined showing deviations from the baseline, i.e. the nominal operation conditions.

The deviation data 104 is subjected to a trend analysis, i.e. it is checked if over time certain characteristics of the data changes. As an example, three trend analyses 105a, 105b, 105c are performed here in parallel.

In the first trend analysis 105a it is checked of there is any temporal trend in the radial, axial and/or tangential vibrational data. A determined trend could trigger a generation of a signal and/or protocol 106 if e.g. a predetermined growth rate threshold is exceeded. The threshold is valid for a range of operation points in order to take into account resonances of the drive train. The threshold could be adapted for the whole range of operation points by the use of á priori knowledge. This means that known magnitudes of harmonics which not related to a bearing failure can be considered to filter out the relevant harmonics for the bearing failure. This would indicate a deviation of the torque. If the determined trend is below the threshold, no signal and/or protocol 106 is generated.

A second trend analysis 105b is performed checking if the radial, axial and/or tangential dynamic load trend exceeds a predetermined growth rate, again being indicative of a deviation of the torque. If the threshold is exceeded, a signal and/or protocol 106 is automatically generated. If not, no signal and/or protocol 106 is generated.

A third trend analysis 105c is performed checking if there are speed fluctuations exceeding predetermined thresholds, this also being indicative of a deviation of torque. If the threshold is exceeded, a signal and/or protocol 106 is automatically generated. If not, no signal and/or protocol 106 is generated.

In other alternatives, other operational parameters are checked for trends exceeding some thresholds. It is possible that less or more than three trend analyses 105a, 105b, 105c are performed. Furthermore, it is possible to use classification algorithms to identify trends in the data. The occurrence of a peak in frequency domain data might e.g. be found with a pattern recognition algorithm.

The signal and/or protocol 106 generated as a result of the trend analysis 105 can have different effects.

One possible effect is the use as a control signal to effect the operation of the gas turbine engine 10 by e.g. reducing the rotation of shafts or shutting the engine off if a damage is detected through the trend analysis 105.

Alternatively or in addition the operational data can be automatically stored.

As there is data available for confirmed functional failures, a damage such as a bearing damage can the identified through a look-up table.

The data could also be used in a life expectation algorithm and/or in the automatic scheduling of maintenance.

In FIG. 5 the use of trend data is described in one embodiment. Alternatively (or in addition) in one embodiment at least two measured states can be used instead of the trend data.

An at least one first state is based on measuring a property depending on the performance (or power) regulation of the gas turbine engine 10. An at least one second state is a measurement of vibrational data from the gas turbine engine 10. Therefore, vibrational data is utilized as input data for the control of gas turbine engine. And in principle is it sufficient, just to have two single state measurements.

The first state depends on the engine power regulation (or performances regulation) having e.g. the form of a vector with n-components determined by a combination of at least one speed value, at least one temperature value, at least one fuel intake value, at least one variable vanes state value, at least one throttle position value, at least one pressure value, at least one torque value, at least one power value, at least one true air speed value, at least one altitude value.

The variable are chosen in order to define the power (performances) regulation condition that may be affected by the malfunctioning of one or more engine components.

The second state depends on the subcomponent vibratory response which is defined by a vector having components determined by a combination of magnitude values, frequency values and phase values of the subcomponent absolute vibration (acceleration, displacement, velocity) as measured in a fixed frame and e.g. of relative vibration as measured between two rotors. The variables can be measured in a number of locations, in radial tangential and axial direction, on one or more engine subsystems or components that are chosen in order to detect the incipit of a failure or malfunctioning of one or more engine sub-components.

The data for the states may be collected on a continuous or periodic basis and the data analysis can be driven by events or intervals Analysis consist of elaboration of the measured parameters and comparison with baseline ranges (e.g. alarms and thresholds).

The comparison of the measured state vectors with a correspondent state baseline, such as threshold ranges e.g. obtained from a look up table may be sufficient to detect engine malfunctioning without further trend analysis.

Advantageously a look up table can cross correlate different parameters, enabling reading a cross methods when not all the parameters are able to be measured. In this respect a parameter belonging to a "state vector" can be extrapolated from the measure of one or more of the other components of the state vectors (e.g. when sensors are not available).

Figure 5A:
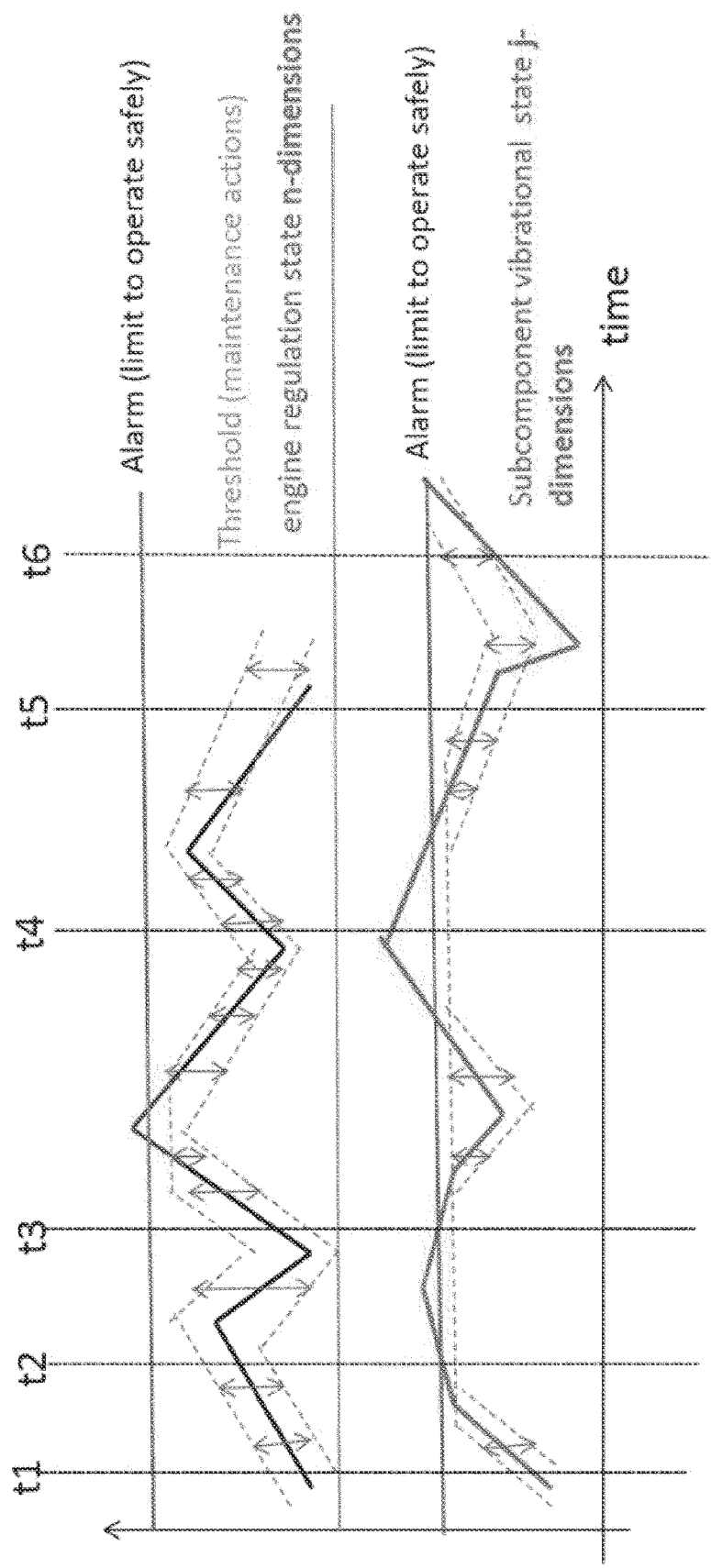
FIG. 5a shows a diagram with determined values and different thresholds (states) and intervals for the values versus time.

In FIG. 5a a combination of the use of trend analysis and the use of state is shown.

FIG. 5a shows a diagram wherein the upper solid line indicates the value of an engine regulation state variable of the first vector (i.e. data related to power regulation) at various points in time between t1 and t6, and the lower solid line indicates a value of a rotatable component vibrational state variable (i.e. data related to vibrational measurements) a at the various points in time between t1 and t6. Around both solid lines, an interval is indicated by dashed lines. This intervals define the normal operational status. For example, the interval of the value of the rotatable component vibrational state may depend on the value of value of one or more engine regulation state variables. A value outside of the interval may trigger an alarm and/or maintenance actions, see at t5 for the upper curve, and between t5 and t6 for the lower curve. For both variables a corresponding horizontal line indicates an alarm threshold. An exceedance triggers an alarm, see between t3 and t4 for the upper curve, and between t2 and t3 and at t4 for the lower curve.

For the analysis of the received vibration signals, an analysis unit may be adapted to perform a frequency-domain analysis. In this regard, an FFT may be applied on the received signals from the one or more vibration sensors 110. Therein, the analysis unit may determine whether or not any signals (e.g., above a predefined threshold) are present in the range of 0.1 to 0.5 or 0.45 times the rotational speed of the rotatable component.

Optionally, a time domain trend analysis may be performed on the vibration signal. For example, an increasing amplitude may be determined, or a peakfinder algorithm may be performed to detect critical signals. Alternatively or in addition, an angular domain analysis may be performed on the vibration signal. Alternatively or in addition, a phase analysis may be performed. As an example the analysis unit may determine a change of a phase of the vibration, because a change of the phase, in particular while the speed of the rotatable component is steady, may indicate an onset of a fluid film instability. As an example, the phase may perform an instantaneous change at a resonance which, in turn, may drive a fluid film instability.

In addition to the vibration sensor 110 signals, other parameters of the machine may be analyzed by a control system. For example, the machine is a gas turbine engine 10 having one, two or three shafts, each driven by a respective turbine. The rotatable component may be driven by one of the shafts. Speed encoders for speeds of the shafts may provide signals to the analysis unit. In this case, a separate speed sensor may be omitted. Further, torquemeters measuring the torque of one or more of the shafts may provide torque signals to the analysis unit. Further vibration sensors for the gas turbine engine may also provide signals to the analysis unit. An engine power measurement result may be provided to the analysis unit. Other engine health parameters may be provided. Particularly, the rotatable component may be a part of the epicyclic gearbox for the fan of the gas turbine engine. A power loss in the gearbox may be determined and also provided as a signal to the analysis unit. The analysis unit 80 may receive one, more or all of the above signals. For the signals that the control system receives, additionally baseline condition values may be provided. Further, such baseline values may be provided versus an engine operating condition, such as speed, torque, flight altitude and/or atmospheric conditions. By means of these baseline conditions, the analysis unit may refine its analysis.

The analysis unit may analyze the vibration signals based on shaft-orders related misalignment and sidebands, bearing defect frequencies, blade passing frequencies, integer-speed-generated harmonic cross-shaft vibration, known natural frequencies (for components, modules and/or the whole engine), the gearmesh frequency, harmonics of the rotatable component, electrically generated harmonics, and/or subsynchronous orders related to gap-dependent vibration. The analysis unit 80 may store one or more of the latter for comparison with the received signals.

In general, the analysis unit may determine, based on the determined vibration signature properties, whether or not there is any trend in a gap-dependent vibration. Further, it may determine whether there is any trend in non-subsynchronous vibration. If either is the case (alternatively, if both are the case) an alarm and or maintenance may be triggered by the analysis unit.

Optionally, the analysis unit 80 performs a phase analysis, particularly extract a phase lag or phase lead, e.g. between one or more vibration signatures and a fixed reference position on the rotatable component. The phase analysis may be carried out in particular on fluid film (key indicator) frequencies, alternatively or in addition on other harmonic and/or subharmonic frequencies that allow to define the position of the rotor.

Figure 6:
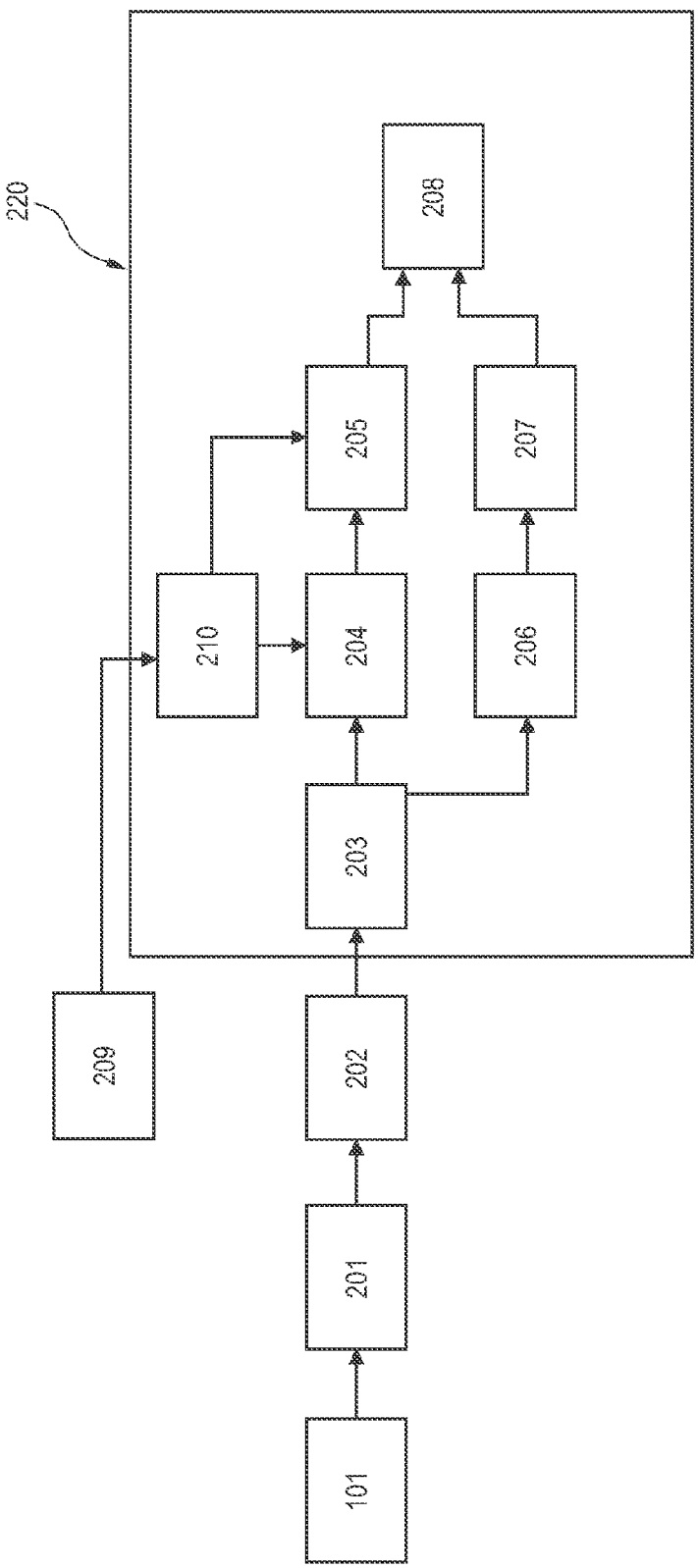
FIG. 6 shows a flowchart showing the signal processing for an embodiment.

In FIG. 6 an embodiment for the signal processing for the obtaining of analyzed operational data 102 is shown.

Starting point is the measured operational data 101, such as e.g. vibrational data obtained from vibrational sensors 101 (see FIG. 2) mounted to static parts of the epicyclic gearbox 30, the ring gear 38 or ring gear mount 41.

This data is subjected to signal conditioning and anti-alias filtering in step 201 and subsequently to an Analog-Digital conversion step 202.

The digital data is then transmitted to a signal processing unit 220 which can e.g. be part of an engine monitoring unit (EMU) of an aircraft gas turbine engine 10.

From the continuous time domain data (i.e. step 201) a time frame (window function) is determined which is used 203 in the signal processing unit 220. The windowed data is then further processed by applying a filter (e.g. low pass filter, bandpass filter) 204 on the time domain data. The cut-off frequency of the filter depends on the engine order 210 (see above) which is calculated using speed information, i.e. speed of shafts and/or speed of planets. After the filtering, features such as RMS (root mean square), skewness, crest factor and/or kurtosis can be determined 205 from time domain data.

Parallel to the processing of time domain data, frequency domain data is generated 206 by a FFT. From that analysis, features, such as harmonics can be extracted 207.

The output of steps 205, 207, i.e. analyzed operational data 102 (time and frequency domain) is further subjected to a classification of the functional failure (e.g. a bearing failure) by analyzing thresholds as discussed in connection with FIG. 5. It is also possible to use classification algorithms, such as Bayes classification.

FIGS. 7a to 7d show the nominal behavior (FIG. 7a, 7c) and the behavior under failure of a journal bearing in an epicyclic gearbox 30 in frequency domain data. The amplitude data has been scaled into a range of 0 to 1 in FIG. 7. The frequency data on the x-axis has been normalized to 100.

Figure 7A:
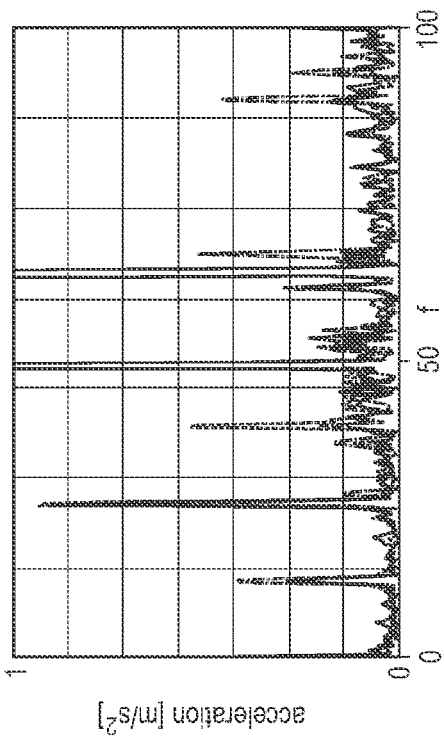
FIGS. 7a to 7d show functional failure data related to the failure of a journal bearings with the data obtained with two sets of sensors.
Figure 7B:
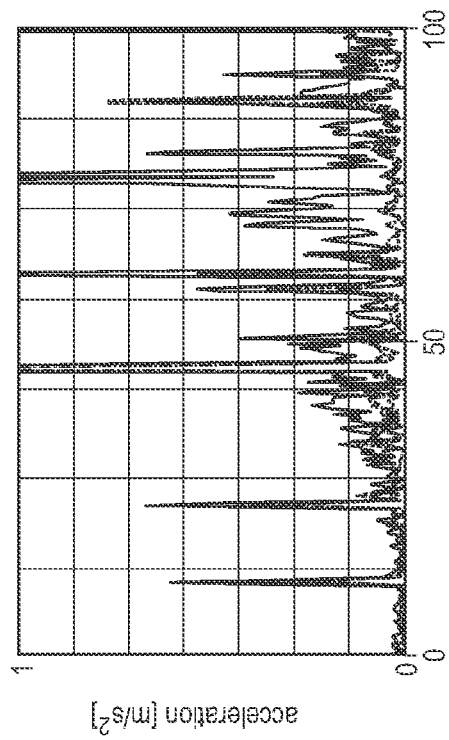

FIGS. 7a and 7b show data obtained by using three radial vibration sensors 101 distributed around the ring gear of the epicyclic gearbox 30.

FIG. 7a shows the nominal behavior with three prominent peaks at frequencies just under 50 and at around 69. Under failure condition, FIG. 7b shows an additional peak at a frequency of 25 which was detected by one of the sensors 101, indicative of a failure in the journal bearing. In principle, this result would also be applicable to other kinds of planet bearings, e.g. roller bearings.

Figure 7C:
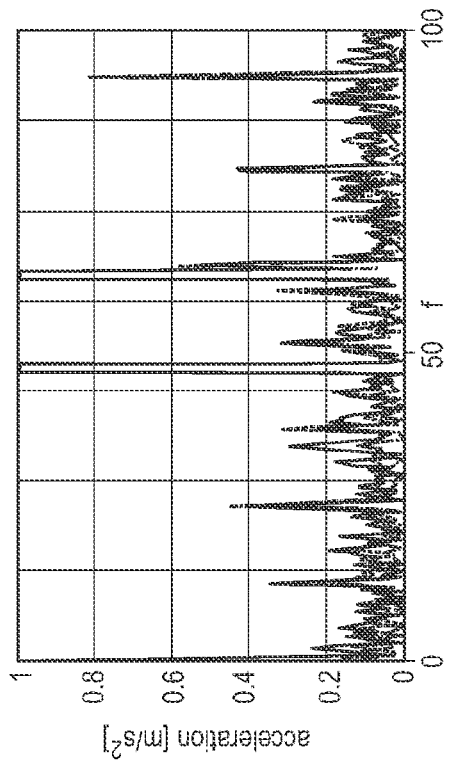
Figure 7D:
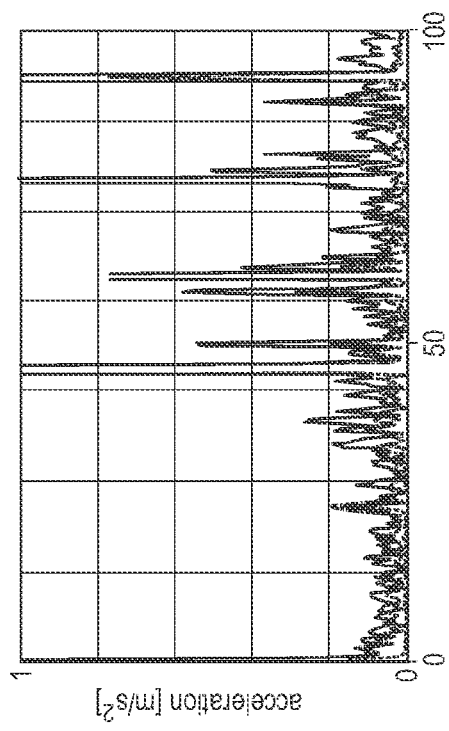

FIGS. 7c and 7d show data obtained by using three vibration sensors 101 distributed around a different part of the epicyclic gearbox 30. The sensors measured radial vibrations.

FIG. 7c shows the nominal behavior with four prominent peaks at frequencies just under 50, and at around 60, at around 75 and at around 90. Under failure condition, there are additional peaks at frequencies 12, 25 and a number of frequencies around 55 in FIG. 8d indicative of a failure of the journal bearing.

The emergence of the peaks in FIGS. 7b and 7d is indicative of the failure of a part, which is a time dependent trend as discussed in connection with FIG. 5. The trend data 105 would comprises the information about the newly emerging peak due to the failure of the part.

Figure 8:
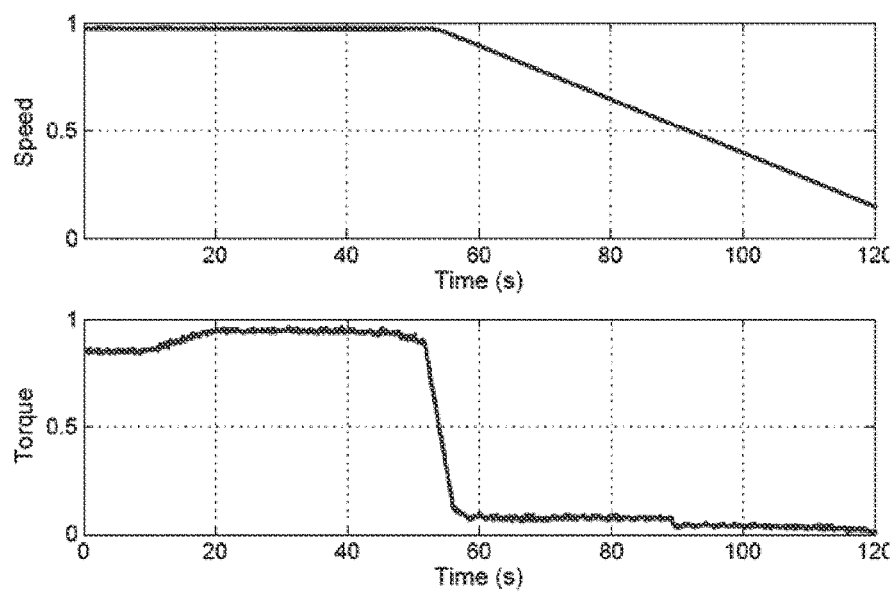
FIG. 8 shows the shutting down of a gas turbine engine after the failure shown in FIG. 7a to 7d.

FIG. 8 shows operational data for the experiment depicted in FIGS. 7a to 7d). The rotation of a shaft of the epicyclic gearbox 30 (speed values normalized to 100) is shown in the upper part, the carrier torque (values scaled into the range −1 to 2), i.e. the torque on the output side of the epicyclic gearbox 30 in planetary arrangement, is shown in the lower part. The x-axis is time units.

At t≈45 the failure in the journal bearing shown in FIG. 7a to 7d occurs and a control signal 106 to shut down the gas turbine engine 10 (see FIG. 5) is generated automatically based on the trend analysis described above. About 10 time units later the engine shut-off can be seen as the shaft speed linearly decreases and the carrier torque drops rapidly.

Figure 9A:
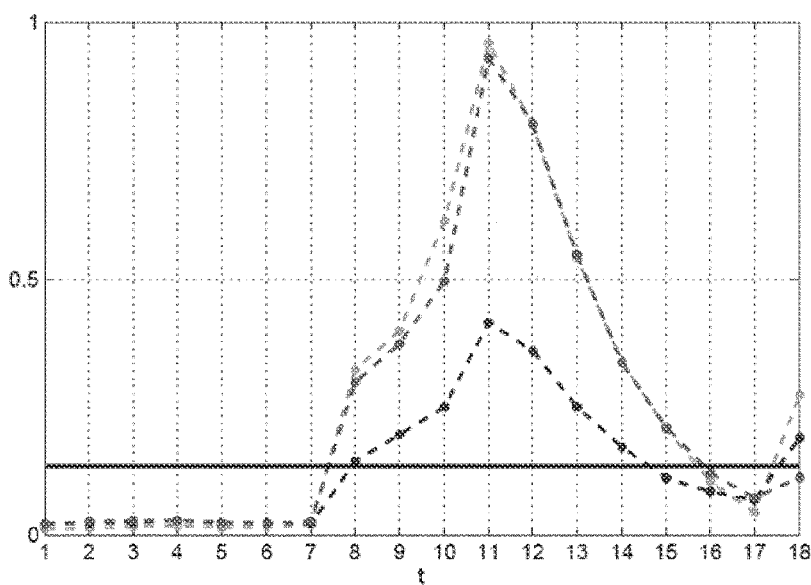
FIGS. 9a and 9b show time domain data for different radial acceleration sensors indicating a failure in a journal bearing.
Figure 9B:
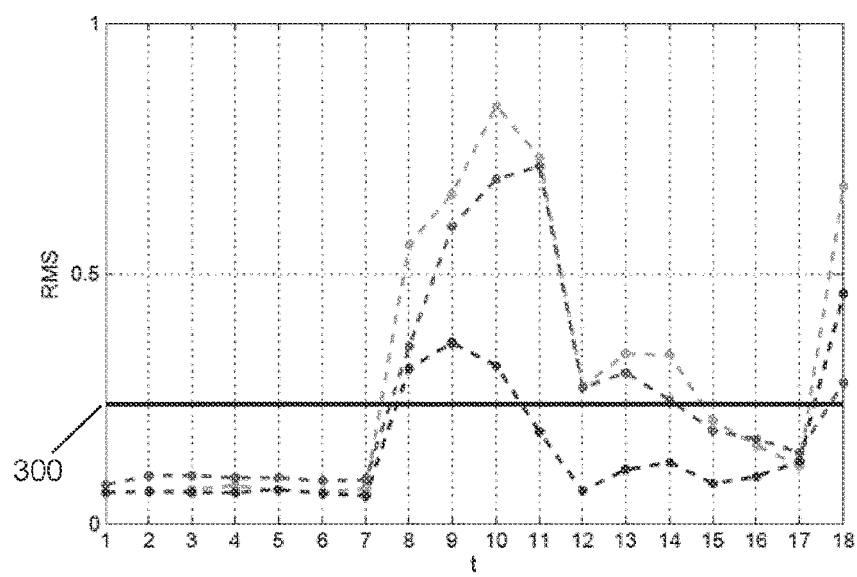

In FIGS. 9a and 9b time domain data (corresponding to the time axis in FIG. 8, with time units from 1 to 18) for RMS is shown in normalized ranges. The figures show radial acceleration data at the diaphragm on the output side of the epicyclic gearbox 30. At time unit 7, the failure occurs, corresponding to t≈45 in FIG. 8.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

LIST OF REFERENCE NUMBERS 9 principal rotational axis
10 gas turbine engine
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct
23 propulsive fan
24 stationary support structure
26 shaft, sun shaft
27 interconnecting shaft
28 sun gear
30 gearbox, power gearbox, epicyclic gearbox
32 planet gears
34 planet carrier
36 linkages
38 ring gear
40 linkages
41 ring gear mount
42 output shaft of gearbox, fan shaft, carrier shaft
101 measured operational data
102 analyzed operational data
103 baseline operational data
104 deviation data
105 trend analysis/trend data
106 signal/protocol for control
110 vibration sensor
201 signal conditioning, anti-alias filtering
202 A-D conversion
203 window function.
204 filtering
205 feature calculation
206 transforming time domain data into frequency domain data
208 classification of failure
209 determination of speed of rotation of an engine part
210 determination of engine order
220 signal processing unit
300 threshold value
A core airflow
B bypass airflow

The invention claimed is:

1. A method for detecting a functional failure in a power gearbox in an aircraft gas turbine engine comprising:
   a) measuring operational data in the gas turbine engine of at least two operational parameters dependent on a power generation and a power consumption of at least one chosen from the gas turbine engine and the power gearbox,
   b) obtaining analyzed operational data comprising at least one chosen from time data, angular data of a rotation, frequency data and phase data from the measured operational data,
   c) using the analyzed operational data in a comparison with stored baseline operational data to determine deviation data from the baseline operational data,
   d) determining at least two time dependent trend data analyses from the deviation data, and
   e) generating at least one chosen from a signal and a protocol for controlling the at least one chosen from the power gearbox and the gas turbine engine based on the at least two time dependent trend data analyses.

2. The method according to claim 1, wherein at least one chosen from the at least two operational parameters and a parameter of the baseline operational data is:
   a torque at a shaft,
   a torque at the power gearbox,
   a tangential torque at the power gearbox,
   a rotational speed of the shaft, a rotational speed of at least one chosen from an input side and an output side of the power gearbox, a power loss over the input side and output side of the power gearbox, a speed of the aircraft, vibrational data at the power gearbox, a fuel intake of the gas turbine engine, a temperature, in at least one chosen from a core of the gas turbine engine and an exit of a combustion chamber, a temperature in at least one chosen from a feed oil temperature and a scavenge oil temperature of the power gearbox, at least one chosen from a position and a movement of a variable guide vane in the gas turbine engine, a pressure in the gas turbine engine, or a deviation from a nominal value of at least one of the above parameters.

3. The method of claim 1, wherein the time data from the measured operational data is subjected to windowing in a signal processing unit.

4. The method of claim 1, wherein the deviation data comprises a change in magnitude of at least one chosen from an amplitude and a change in a phase of the phase data.

5. The method of claim 1, wherein the at least two time dependent trend data analyses comprises data on at least one rotational speed of a shaft, at least one chosen from a radial, an axial and a tangential dynamic load indicator, or at least one chosen from a radial, an axial and a tangential vibration.

6. The method of claim 1, wherein the at least two trend data analyses is checked if a condition or threshold is exceeded for at least a trend in at least one chosen from a radial, an axial and a tangential vibration, a trend in at least one chosen from a radial, an axial and a tangential dynamic load indicator, or a trend in speed.

7. The method of claim 6, wherein the threshold is adapted for a range of operation points by use of known knowledge that known magnitudes of harmonics which are not related to a failure are considered in filtering out relevant harmonics for the failure.

8. The method of claim 1, wherein at least one chosen from the signal and the protocol is used for indicating a functional failure of at least one chosen from a bearing, i a ring gear, a planet carrier, a sun gear and a planet gear.

9. The method of claim 1, wherein at least one chosen from the signal and the protocol is used for generating at least one chosen from a lifetime prediction and a maintenance schedule for the power gearbox.

10. The method of claim 1, wherein at least one chosen from the signal and the protocol is triggered when the measured operational data comprises vibrational frequencies of more than 500 Hz.

11. The method of claim 1, wherein the measured operational data is obtained from at least one chosen from a power sensor, a fuel flow sensor, a torque sensor, a rotational speed sensor, a speed sensor, a vibration sensor, a temperature sensor and a pressure sensor.

12. The method of claim 11, wherein at least one sensor is positioned at at least one chosen from a static part of the power gearbox, a ring gear and a ring gear mount.

13. The method of claim 1, wherein the power gearbox is an epicyclic gearbox comprising planetary gears in a star arrangement or in a planetary arrangement.

14. The method of claim 1, comprising detecting a vibration signature within a predetermined frequency range, determining a property of the vibration signature at different points in time, and generating a command or signal based on a comparison of the property of the vibration signature with a predetermined threshold.

15. A system for detecting a functional failure in a power gearbox, in an aircraft gas turbine engine comprising:

at least one sensor measuring operational data in the gas turbine engine of at least two operational parameters dependent on at least one chosen from power generation and power consumption of the gas turbine engine and the power gearbox, a computing device including a processor and configured for obtaining analyzed operational data comprising at least one chosen from time data, angular data of a rotation, frequency data and phase data from the measured operational data and for using the analyzed operational data in a comparison with stored baseline operational data to determine deviation data from the baseline operational data, a trend computing device including a processor and configured for determining at least two time dependent trend data analyses from the deviation data, and at least one chosen from a generation device and a protocol generation device for controlling at least one chosen from the power gearbox and the gas turbine engine based on the at least two time dependent trend data analyses.

16. A gas turbine engine for an aircraft comprising:

an engine core comprising a turbine, a compressor, and a core shaft connecting the turbine to the compressor;

a fan located upstream of the engine core, the fan comprising a plurality of fan blades; and a power gearbox, that receives an input from the core shaft and outputs drive to the fan so as to drive the fan at a lower rotational speed than the core shaft, with the system of claim 15.

* * * * *